(12) United States Patent
Reitemeyer et al.

(10) Patent No.: US 8,450,639 B2
(45) Date of Patent: May 28, 2013

(54) LASER MACHINING HEAD WITH INTEGRATED SENSOR DEVICE FOR FOCUS POSITION MONITORING

(75) Inventors: Daniel Reitemeyer, Bremen (DE); Knut Partes, Syke (DE); Thomas Seefeld, Bremen (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 604 days.

(21) Appl. No.: 12/697,440

(22) Filed: Feb. 1, 2010

(65) Prior Publication Data

US 2010/0276403 A1 Nov. 4, 2010

(30) Foreign Application Priority Data

Feb. 5, 2009 (DE) .......................... 10 2009 007 769

(51) Int. Cl.
*B23K 26/14* (2006.01)
(52) U.S. Cl.
USPC ............ 219/121.67; 219/121.74; 219/121.75; 219/121.83
(58) Field of Classification Search
CPC .. B23K 26/00; B23K 26/0063; B23K 26/0665; B23K 26/04; B23K 26/041; B23K 26/043; B23K 26/046; B23K 26/0643; B23K 26/0648
USPC 219/121.61, 121.62, 121.83, 121.63–121.72, 219/121.74, 121.75
See application file for complete search history.

(56) References Cited

U.S. PATENT DOCUMENTS

| | | | | | |
|---|---|---|---|---|---|
| 5,457,529 | A | * | 10/1995 | Tank et al. | ...................... 356/455 |
| 6,172,323 | B1 | * | 1/2001 | Ishide et al. | ................ 219/121.5 |
| 2004/0026389 | A1 | * | 2/2004 | Kessler et al. | ............ 219/121.83 |
| 2008/0100829 | A1 | * | 5/2008 | Watson | .......................... 356/123 |

FOREIGN PATENT DOCUMENTS

| | | |
|---|---|---|
| DE | 10 2004 020 704 A1 | 11/2005 |
| DE | 10 2007 039 878 A1 | 5/2008 |
| JP | 60 096392 A | 5/1985 |
| JP | 61 137693 A | 6/1986 |
| JP | 2002 346783 A | 12/2002 |

\* cited by examiner

*Primary Examiner* — Khiem D Nguyen
(74) *Attorney, Agent, or Firm* — Duane Morris LLP

(57) ABSTRACT

The invention relates to a laser machining head (1) with an integrated sensor device for monitoring the focus position, wherein laser machining head (1) has a focusing lens (4) and a downstream protective glass (5) in order to focus a machining beam (9) that strikes focusing lens (4) as a parallel beam into a resultant focal point (11) of focusing lens (4) with downstream protective glass (5), in which focal point a workpiece (12) is arranged. A beam splitter (3), arranged upstream of focusing lens (4) in the beam path, is transmissive for a first portion of a laser beam (8) coupled into laser machining head (1), the machining beam (9), and is reflective for a second portion, a measurement beam (10). In the reflection direction, a mirror (6) is arranged downstream of beam splitter (3) in such a manner that it reflects measuring beam (10) at an angle α to the optical axis of focusing lens (4) onto the latter in order to image it in an image point (17), conjugate with focal point (11), on the receiving surface of sensor (13) that is connected to an evaluation unit (14) for focus position monitoring.

5 Claims, 1 Drawing Sheet

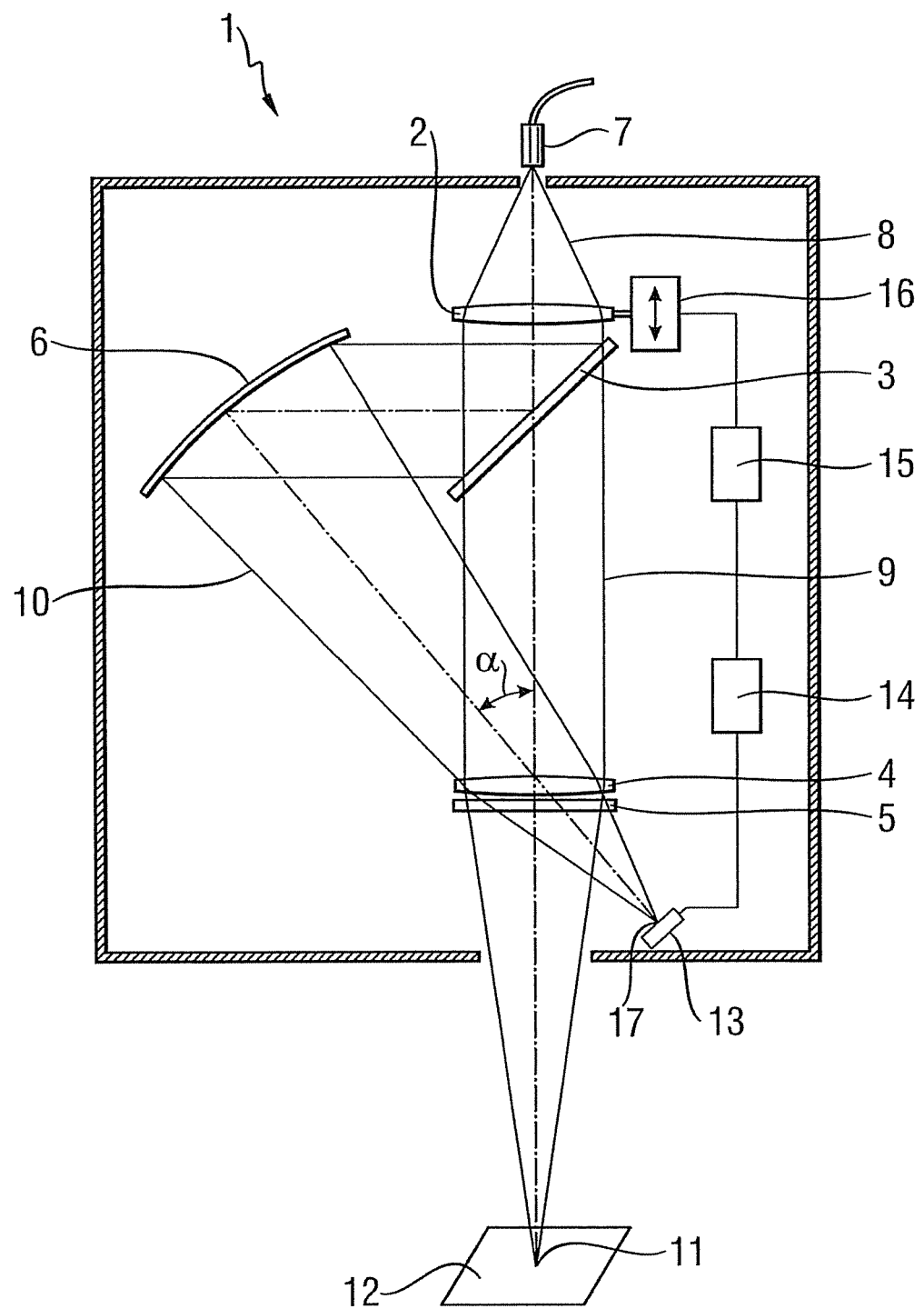

LASER MACHINING HEAD WITH INTEGRATED SENSOR DEVICE FOR FOCUS POSITION MONITORING

FIELD OF THE INVENTION

The invention relates to a laser machining head of the type known from DE 10 2004 020 704 A1.

BACKGROUND OF THE INVENTION

In material machining processes, the quality of the process result is crucially dependent on the stability of the process parameters, which is why process parameters that can change in an uncontrolled manner during the machining process are monitored and also readjusted.

A known measure in laser material machining is to monitor the fluctuations of the laser power by coupling out a certain portion of the laser beam and routing it to a radiation-sensitive sensor. The received signal can then be used to regulate the laser power.

Monitoring the laser machining process by detecting radiation coming from the area of interaction between the laser beam and the workpiece is also known. For this purpose a dichroic mirror, for example, which allows the laser radiation to pass without hindrance but reflects the radiation coming from the interaction area onto a sensor, is inserted into a laser machining head via which a laser beam is focused onto a workpiece. The characteristics of the radiation detected by the sensor can differ in intensity, intensity distribution and wavelength, depending on the conditions in the interaction area. Changes in the radiation characteristics, and thus the received signals that are obtained, are caused by fluctuations of several process parameters. In particular, these can be fluctuations of laser power, feed rate, focus position, the locally differing heating of the workpiece, the supplying of protective gas, and the gap width in laser welding. That is to say, the receiver signals do not represent the fluctuations of individual process parameters such as the focus position, but instead only allow inferences regarding the quality of the process result as a whole, e.g., the weld seam, the cut, or the drill hole. Process monitoring of this type primarily therefore mainly serves to monitor the success of the process.

PRIOR ART

A laser machining head with an integrated sensor device for process monitoring of this type, particularly in laser welding, is known from DE 10 2004 020 704 A1.

With regard to signal utilization, it is stated there that, for example, a status signal can be derived that indicates the success of the welding. From the signals of the individual receivers, one is also able to represent receiver arrangement (sensor) temperature profiles that are compared with a target temperature profile. Ultimately, it is said to be possible to use the signals for geometrical evaluation of the weld site for purposes such as seam tracking, gap width measurement and/or seam volume calculation.

The signal detection is to serve either to document the aforementioned quality characteristics or to regulate the machining process.

The radiation detected by the sensor is a radiation excited in the interaction zone between laser radiation and workpiece, whereas already stated the characteristics of the detected radiation are influenced by all fluctuations of the process and workpiece parameters.

A laser machining head in accordance with DE 10 2004 020 704 A1 comprises a housing with a beam entry opening and a beam exit opening, as well as a focusing lens that focuses a parallel-incident laser beam into an area (the working focus) situated outside the housing. A beam splitter is upstream of the focusing lens as seen in the direction towards the beam exit opening. The beam splitter allows the laser beam to pass and reflects radiation that comes from the interaction zone of the laser beam with the workpiece. The workpiece, and therefore the interaction zone, is positioned, downstream of the laser head in the direction of the radiation, a predetermined distance from the beam exit opening such that the working focus lies on the workpiece.

The beam splitter can be a focusing ring mirror, for example, with a sufficiently large aperture for the laser beam passing through, that reflects the incident radiation onto a sensor and thus images part of the interaction zone.

One or more photodiodes with identical or different spectral sensitivities, a camera, or one-dimensional or two-dimensional CCD image sensors can be used as sensors. It is also possible to use a position-sensitive detector or a photosensitive receiver based on CMOS technology as the sensor.

The sensor supplies output signals to an evaluation unit, where they are processed to form suitable status signals for quality assurance and for supply to a control-regulation device controlling or regulating the laser machining process.

To summarize, an integrated sensor device of a laser machining head in accordance with DE 10 2004 020 704 A1 is formed by the focusing lens, available in any case in the laser machining head, for focusing the laser beam, a focusing beam splitter, and a sensor, as well as an evaluation unit and optionally a control and regulation unit.

The fluctuations of the process parameters, and their effect on the quality of the process result depend essentially on the parameters of the laser. In particular, when solid-state lasers with high power and beam quality, such as multi-kilowatt fiber lasers, are used, thermal stress on the optical components of the laser processing head increases in a previously unknown manner. Although the optically transmissive or reflecting elements typically have a transmissivity or reflectivity of over 99% for the wavelength of the machining laser radiation, the remaining, absorbed intensity is sufficient to heat the elements. This can lead to a modification of their surface shape, which has an effect on their focal length.

Since the laser beam does not completely illuminate the entire surface of an optical element, and the intensity distribution is not uniform over the beam cross section, the formation of a temperature gradient occurs in addition to the actual heating. Since the index of refraction of the optical material is temperature-dependent, there is the additional effect on the transmitting elements that the focal length changes differently in the radial direction.

If one considers, not just a single optical element, but the entire optical system from the emission plane of the radiation source (the end of a fiber constitutes a secondary radiation source) to the desired point of incidence on or in a workpiece, then a shift in the imaging of the radiation source occurs due to the change in the focal length of the individual optical elements, in particular, the collimating lens and the focusing lens. The radiation source is imaged in the focal point of the focusing lens only if the focal point of the collimating lens actually lies in the plane of the radiation source, or in a plane conjugate to it.

The term focus position shift is accordingly not entirely correct for a complete system; one should instead more correctly speak of shifting of the image plane. Since this shift is produced by the change in the focal length of the individual elements, however, one speaks of a focus position shift even in a system in which the imaging theoretically takes place in the focus of the final imaging element. This applies even if there is a protective glass, which shifts the image corresponding to its thickness, downstream of the final imaging element.

When the laser radiation is coupled into the laser machining head via an optical fiber, then in the direction of the radiation, a collimating lens for parallelizing the laser beam and a focusing lens for focusing the laser beam into a working focus outside the laser machining head are arranged in the laser machining head.

In addition to the aforementioned optical elements, a protective glass is situated downstream of the focusing lens in a typical laser machining head. Also known are laser machining heads that have a beam splitter in the beam path of the laser beam in order to couple out parts of the laser beam or, as in DE 10 2004 020 704 A1, to direct radiation excited in the interaction zone that is incident into the beam path of the laser beam on the side of the beam exit opening onto a sensor.

The laser light can also be coupled into the laser machining head via an articulated mirror arm, rather than via an optical fiber cable. As a rule, a collimating lens is arranged in the articulated mirror arm itself so that the laser beam enters the laser machining head already in parallelized form, and only a focusing lens need be present as a beam-shaping optical element in the laser machining head.

The position of the working focus relative to the workpiece is determinative for the spatial distribution of the radiation intensity. Depending on the desired process result, the workpiece and the laser machining head are therefore positioned relative to one another in such a manner that the working focus lies above, on or in the workpiece. For laser cutting, for example, it can be advantageous to track the working focus in a defined manner with increasing machining depth.

In both cases, an uncontrolled change of focus position is undesired. It can lead to a considerable reduction in the quality of the process result. For instance, the depth of a weld can change, the hole cross section can increase, or the depth of the hole can decrease. In the extreme case, the machining process is no longer possible.

It is customary to influence the process result by a correction of the focus position, wherein the control signals are obtained from a process monitoring as in DE 10 2004 020 704 A1. As is presented in detail, these control signals are influenced by a number of process parameters, and are therefore less suitable.

Instead of correcting an uncontrolled change of focus position, there are efforts to reduce it.

For this purpose, there are current approaches such as using zinc sulfide for laser optics instead of quartz, which is typically used. First, this material has a coefficient of thermal conduction greater than that of quartz glass by a factor of 20, whereby a more homogeneous thermal conduction inside the lens and an improved heat transfer out of the material can be achieved. Overall, a longer thermal time constant is achieved.

In addition, zinc sulfide is a material that, in contrast to quartz glass, is suitable for diamond machining. It is thereby possible to produce aspheric surfaces, which yields the advantage that an arrangement of two lenses for collimating and subsequent focusing can be replaced by a single lens, and thus the number of optical elements in the beam path can be minimized.

OBJECTS OF THE INVENTION

It is the problem of the invention to find a laser machining head with an integrated sensor device with which an uncontrolled change of focus position can be precisely detected, in order to compensate for this exceeding of the specified tolerance limit in a regulated manner.

The laser machining head should advantageously also have a sensor arrangement known from prior art for process observation.

SUMMARY OF THE INVENTION

This problem is solved for a laser machining head with integrated sensor device by the characteristics of Claim 1. Advantageous refinements of the invention are described in the subordinate claims.

It is essential to the invention that the parallelized laser beam be subdivided into a measurement beam and a machining beam, and that the measurement beam be imaged by the focusing lens at an angle to the machining beam into an image point in which a radiation-sensitive sensor is arranged.

Advantageously, a flat mirror is not used for deflecting the measurement beam onto the focusing lens, but instead a focusing mirror is used, which results in an image point not only outside the machining beam, but also close to the focusing lens, and the housing of the laser machining head need be only marginally enlarged.

Advantageously, a sensor device for process monitoring is also integrated into the laser machining head, wherein the sensor device for process monitoring and the sensor device for focus position monitoring advantageously use a common beam splitter.

Based on the fact that optical elements arranged exclusively in the measurement beam, namely, at least one deflection mirror, are subjected to only a fraction of the radiation energy of that for the optical elements that are situated in the machining beam, the thermal stress on them has no detectable influence on a change in focus position.

On the contrary, all optical elements that are impacted by the machining beam, with the exception of the beam splitter, are also in the measurement beam path, for which reason the measurement beam is influenced in the same manner as is the machining beam, and the measurement signals thus reflect the shift in focus position of the entire system. The beam splitter either has only a negligible influence on the shift of focus position, or has no influence at all in an embodiment as an aperture mirror, for example, since the machining beam is guided through the aperture.

BRIEF DESCRIPTION OF THE DRAWINGS

Based on the drawing, the device will be explained by way of example below. Therein:

FIG. 1 shows a sketch of the principle of an advantageous embodiment of a laser machining head in accordance with the invention.

DESCRIPTION OF THE EMBODIMENTS

The advantageous embodiment of the laser machining head 1 shown in FIG. 1 has a collimating lens 2, a beam splitter 3, a focusing lens 4, a downstream protective glass 5 and a mirror 6 as its optical elements.

A laser beam 8 is coupled into laser machining head 1 in the direction of the optical axis of collimating lens 2 via a beam entry opening at which the exit face of an optical fiber 7 is arranged and which is situated in the focal plane of collimating lens 2. The laser beam 8 parallelized by collimating lens 2 strikes beam splitter 3, which divides laser beam 8 into a machining beam 9 and a measurement beam 10. Beam splitter 3 can be a geometrically splitting as well as a physically splitting beam splitter 3. Beam splitter (3) is transmissive for a first portion of a laser beam (8) coupled into laser machining head (1) and is reflective for a second portion. The first portion of the laser beam is the machining beam (9), and the second portion is the measuring beam (10). Measurement beam 10 is only a small fraction of laser beam 8, preferably less than 5%, sufficient to produce usable measurement signals. An aperture mirror or a partially reflective flat plate is particularly suitable as a geometric beam splitter 3. The partial mirror coating can advantageously be a peripheral annular surface or a central circular surface in order to obtain a defined intensity distribution in measurement beam 10. Machining beam 9 then strikes focusing lens 4 and downstream protective glass 5 and is focused into their resulting focal point 11 in which a workpiece 12 is arranged. The described measurement beam path is an ordinary beam path inside an ordinary laser machining head. It is also customary to couple out a measuring beam 10.

What is new and essential to the invention is that measuring beam 10 penetrates all optical elements, other than beam splitter 3, that are also in the machining beam path, and is imaged in an image point 17 conjugated with focal point 11. To achieve this, the mirror 6 is arranged downstream of beam splitter 3 in the reflection direction. Minor 6 could be a flat minor. It would then merely deflect measuring beam 10, so that it, just like the machining beam 9, strikes focusing lens 4, but at an angle $\alpha$. It would be disadvantageous, however, for measuring beam 10 to then likewise be imaged into the resulting focal plane of focusing lens 4 and protective glass 5, which would be problematic for the arrangement of a sensor 13 in the image plane. Minor 6 is therefore advantageously embodied as a focusing minor 6 with a focal length matched to the focal length of focusing lens 4, so that sensor 13 can be positioned in an image point 17 outside the machining beam path, as closely as possible to protective glass 5. Minor 6 is also arranged as closely as possible to beam splitter 3, but outside the laser beam path, whereby a housing that contains the aforesaid optical elements including sensor 13 is not noticeably larger than a housing for a laser machining head 1 without an integrated sensor device for monitoring the focus position.

Sensor 13 is connected to an evaluation unit 14 that passes the process measurement signals on to a control and regulation device 15, which is connected to a displacement device 16. In principle, collimating lens 2 is displaced with displacement device 16 along its optical axis to readjust the focus position regulation, but focusing lens 4 could also be displaced. Such displacement devices are known from prior art and are not subject matter of the invention.

The following sensor types, in particular, are suitable as sensor 13: wavefront sensor, position sensitive sensors, CCD area sensors, CCD line sensors.

In case of a shift in focus position, the radiation intensity striking sensor 13 changes its intensity maximum and its intensity distribution over an increasingly larger circle of confusion as the deviation of the focus position increases. A change in the focus position can be directly deduced from the intensity distribution, whereas a reduction of the intensity maximum can also be caused by laser power fluctuations. Therefore, both a power fluctuation and a shift of focus position can be derived by suitable evaluation algorithms from the obtained measurement signals.

That is to say, it is possible to obtain not only measurement values that can be used as a regulation parameter to reregulate the focus position, but also values with which the laser power can also be reregulated.

In a second embodiment, not shown, laser machining head 1 additionally contains an integrated sensor device for process control, as is known, for example, from DE 10 2004 020 704 A1.

Beam splitter 3 is then designed such that it not only couples out measuring beam 10 but also directs radiation coming from workpiece 12, incident via focusing lens 4 into laser machining head 1, onto an additional sensor.

Beam splitter 3 can advantageously be a plane-parallel plate that is mirror-coated on both sides, with a second focusing lens upstream of the additional sensor. The optically active side face that comes first in the radiation direction performs, as already explained, a geometric subdivision of laser beam 8 into a machining beam 9 and a measuring beam 10. For this purpose, the front side face is furnished with a partial mirror-coating, which advantageously covers the center of the planar plate in a circular shape, or the periphery in an annular shape. A measuring beam 10 with a concentrically distributed radiation intensity is thereby coupled out, which is advantageous for the formation of the measurement signals. The optically active side face at the rear in the direction of radiation is completely covered with a dichroic coating. This coating has the effect that machining beam 9 is transmitted unhindered, and radiation coming from workpiece 12, which has a different wavelength compared to machining beam 9, is reflected.

Beam splitter 3 can also be an aperture mirror, the rear side of which advantageously has a concave shape in order to focus the reflected radiation onto the second sensor. Beam splitter 3 then represents a planoconcave annular lens mirror-coated on both sides. The planar annular surface couples the measuring beam out of the laser beam, and the concave annular surface reflects a radiation coming from the workpiece 12 and directs it onto the receiving surface of a downstream additional sensor for process monitoring. The laser beam remains completely uninfluenced by the beam splitter.

List of Reference Numbers
1 Laser machining head
2 Collimating lens
3 Beam splitter
4 Focusing lens
5 Protective glass
6 Mirror
7 Optical fiber
8 Laser beam
9 Machining beam
10 Measuring beam
11 First resultant focal point
12 Workpiece
13 Sensor
14 Evaluation unit
15 Control and regulation device
16 Displacement device
17 Image point While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. Laser machining head having an integrated sensor device for focus position monitoring, said laser machining head comprises means for monitoring said focus position including a focusing lens having an optical axis and a focal length and a downstream protective glass in order to focus a machining beam that strikes said focusing lens as a parallel beam into a resultant focal point of said focusing lens with a downstream protective glass, in which focal point a workpiece is arranged, a beam splitter for dividing a laser beam arranged upstream of the focusing lens in the parallel beam path, a sensor connected to an evaluation unit, wherein said beam splitter divides said laser beam, which is coupled into the laser machining head, into the machining beam and a measuring beam, and a mirror arranged downstream of the beam splitter in such a manner that it reflects the measuring beam at an angle α to said optical axis of the focusing lens onto the focusing lens in order to image it onto a receiving surface of the sensor in an image point conjugate with the focal point.

2. The laser machining head according to claim 1, wherein the mirror is a focusing mirror having a focal length, said focal length being matched to the resultant focal length of the focusing lens with the downstream protective glass in such a manner that the sensor is arranged outside of the machining beam as close as possible to the downstream protective glass.

3. The laser machining head according to claim 1, characterized in that the beam splitter is an aperture mirror.

4. The laser machining head according to claim 1, characterized in that the beam splitter is a plane-parallel plate mirror-coated on both sides, which effects a geometric beam splitting of the laser beam into a measurement beam and a machining beam, and further reflects radiation coming from the workpiece with a wavelength different from the machining laser radiation.

5. The laser machining head according to claim 3, characterized in that the beam splitter is a planoconcave annular lens mirror-coated on both sides, wherein the planar annular surface couples the measuring beam out of the laser beam and the concave annular surface reflects radiation coming from workpiece.

* * * * *